United States Patent [19]

Charles

[11] 3,851,220

[45] Nov. 26, 1974

[54] MODULAR FAIL-SAFE TELEPHONE STATION PROTECTOR

[76] Inventor: Joseph T. Charles, 4902 Tollview Dr., Rolling Meadows, Ill. 60008

[22] Filed: Dec. 12, 1973

[21] Appl. No.: 423,922

Related U.S. Application Data

[63] Continuation-in-part of Ser. No. 289,541, Sept. 15, 1972, abandoned.

[52] U.S. Cl. .................... 317/61.5, 317/62, 337/32, 337/34

[51] Int. Cl. .................... H02h 9/06

[58] Field of Search ......... 337/32, 34; 317/61, 61.5, 317/62, 66, 69, 31

[56] References Cited

UNITED STATES PATENTS

| | | | |
|---|---|---|---|
| 1,382,795 | 6/1921 | McNeill | 317/66 |
| 2,620,453 | 2/1952 | Beese | 317/62 |
| 2,896,128 | 7/1959 | Fuller | 317/31 |
| 3,312,868 | 4/1967 | Vodicka | 317/61.5 |
| 3,522,570 | 8/1970 | Wanaselja | 337/34 |
| 3,535,779 | 10/1970 | Wanaselja | 337/32 |

*Primary Examiner*—James D. Trammell
*Attorney, Agent, or Firm*—Wolfe, Hubbard, Leydig, Voit & Osann, Ltd.

[57] ABSTRACT

A telephone station protector having a unitary molded plastic base provided with two pairs of line terminals for receiving two pairs of conductors representing two telephone lines, and a fifth ground terminal. The active elements of the protector are fail-safe gas-filled lightning arrester tubes encased in two unitary modules, and the protector base forms two areas for receiving the two modules. Either one or two modules may be used, depending upon whether the protector is serving one or two telephone lines at the subscriber facility where it is located. Each module contains two electrode pairs with gas-filled discharge chambers therebetween, a pair of line conductors each connected to an electrode of one of the two pairs, and a ground conductor common to both pairs. The modules are mounted flush against the protector base to provide a low profile unit. Adequate rigidity of the mounted modules is provided by the three line conductors which extend outwardly from the modules containing the gas tubes for connection to respective terminals on the protector base. The protector base is also designed to accommodate the mounting of other electrical transmission aids such as, for example, load coils, build-out capacitors and the like.

8 Claims, 11 Drawing Figures

PATENTED NOV 26 1974

3,851,220

MODULAR FAIL-SAFE TELEPHONE STATION PROTECTOR

RELATED APPLICATION

Charles, Ser. No. 289,541, now abandoned, filed Sept. 15, 1972, entitled "Modular Fail-Safe Telephone Station Protector;" the present application being a continuation-in-part thereof.

DESCRIPTION OF THE INVENTION

The present invention relates generally to telephone station protectors and, more particularly, to protectors adapted for the connection of two telephone pairs within the same protector unit.

It is a primary object of the present invention to provide an improved telephone station protector in which the active elements are fail-safe type, gas-filled, lightning arrester tubes mounted in a manner to provide quick and easy replacement of the active elements. In this connection, a more specific object of the invention is to provide such an improved telephone station protector in which the gas tubes protecting any given telephone line can be quickly and easily replaced whenever a tube is permanently grounded by an excessive voltage surge.

Another object of the invention provides an improved telephone station protector of the foregoing type which permits either one or two pairs of active elements to be provided in the protector at any given time, for protecting either one or two conductor pairs representing different telephone lines, without requiring the installation of an additional protector assembly.

It is a further object to provide a low cost telephone station protector of the type described above which can be efficiently manufactured and installed with a minimum amount of labor.

Still another object of the invention lies in the provision of an improved telephone station protector as described herein which minimizes service and maintenance time. A related object of the invention is to provide such an improved station protector which has a long operating life, particularly as compared with the relatively short life of carbon-type protectors.

A still further object is to provide such a telephone station protector which has an improved cover which can be easily and quickly attached to and detached from the protector base and which provides a secure closure for the protector.

Yet another and more specific object provides a telephone station protector wherein the arrester tubes are in modular form and may be mounted to provide a low profile system yet achieving sufficient rigidity to prevent undesired movement of the modules.

A further object of the invention lies in the provision of a telephone station protector system characterized by its versatility in permitting the housing of additional electrical components to, for example, balance the transmission in the telephone lines.

A still further object provides a telephone station protector which allows termination of the metallic shield grounding within the protector housing.

Other objects and advantages of the invention will become apparent upon reading the following detailed description and upon reference to the accompanying drawings, in which.

Figure 1:
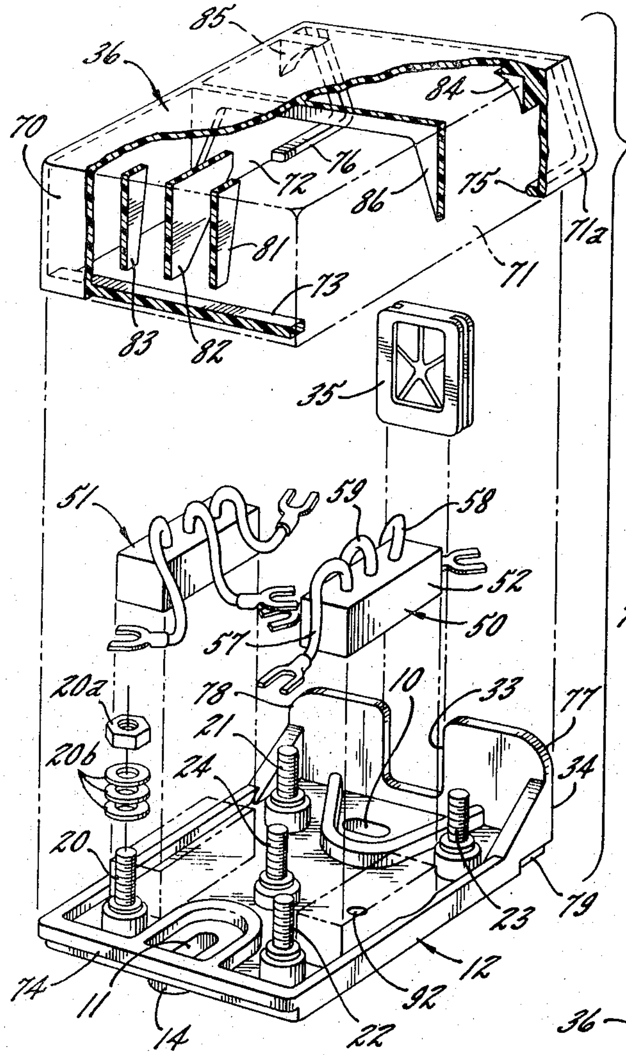
FIG. 1 is an exploded perspective of a telephone station protector embodying the invention.
Figure 10:
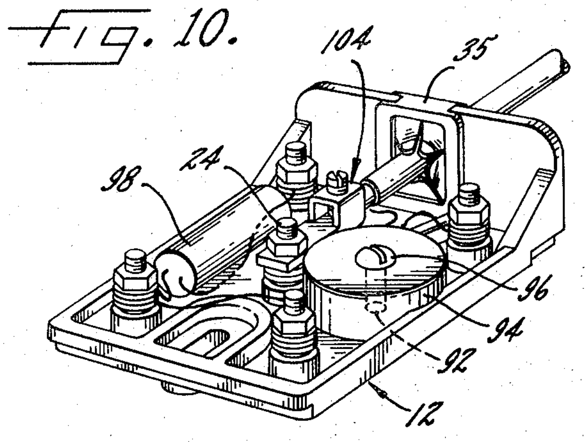
Figure 11:
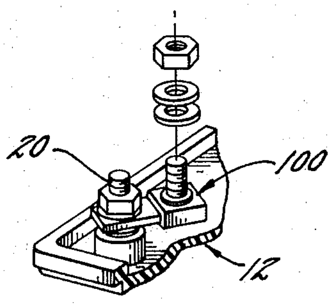

FIG. 10 is a perspective view of the terminal block of the present invention and illustrating the novel mounting means for the arrester modules, the mounting of auxiliary electrical components and the interior termination of the metallic shield grounding; and FIG. 11 is a fragmentary perspective view of the terminal block shown in FIG. 1 and illustrating a copper/aluminum interface connector mounted on a terminal.

While the invention will be described in connection with certain preferred embodiments, it is to be understood that the invention is not limited to these particualr embodiments. On the contrary, it is intended to cover all alternatives, modifications, and equivalent arrangements as may be included within the spirit and scope of the invention. It should be accordingly understood that, while the illustrative embodiment shows a post or stud-type terminal, any other type of terminal may similarly be used.

Figure 2:
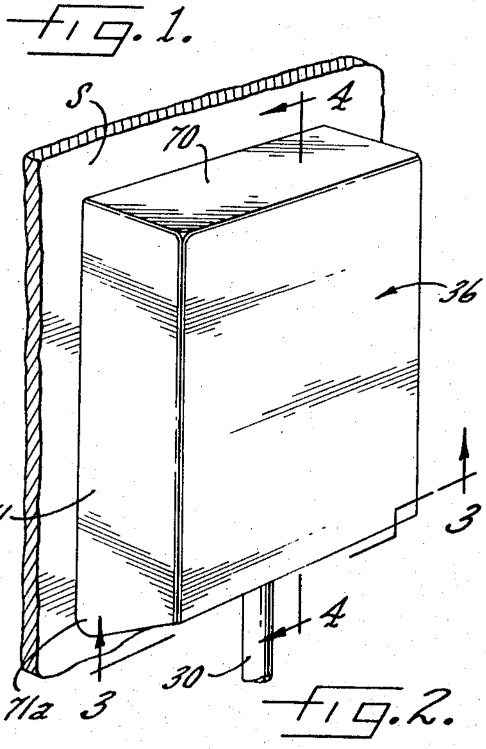
FIG. 2 is a perspective of the station protector of FIG. 1 assembled and mounted on a supporting surface.
Figure 3:
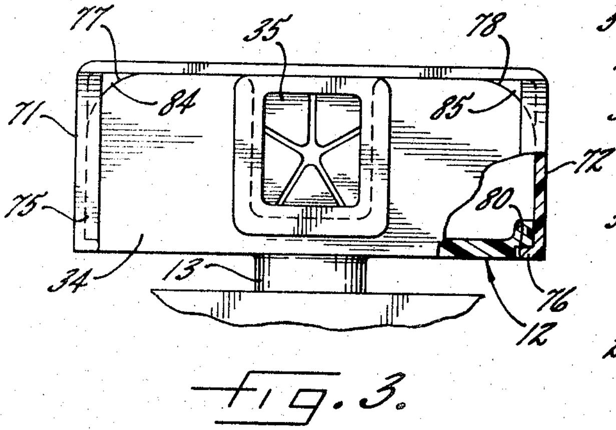
FIG. 3 is an enlarged end elevation view of the station protector of FIGS. 1 and 2, taken along line 3—3 in FIG. 2.
Figure 4:
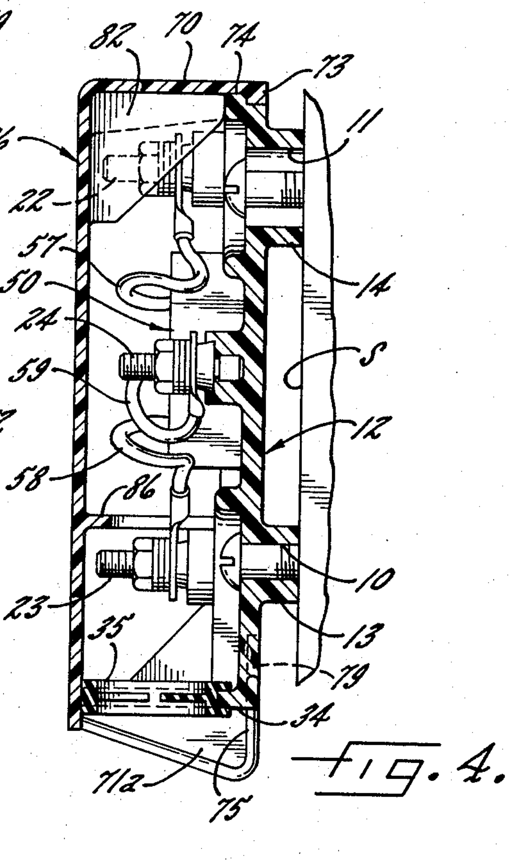
FIG. 4 is an enlarged section taken along line 4—4 in FIG. 2.
Figures 5, 6:
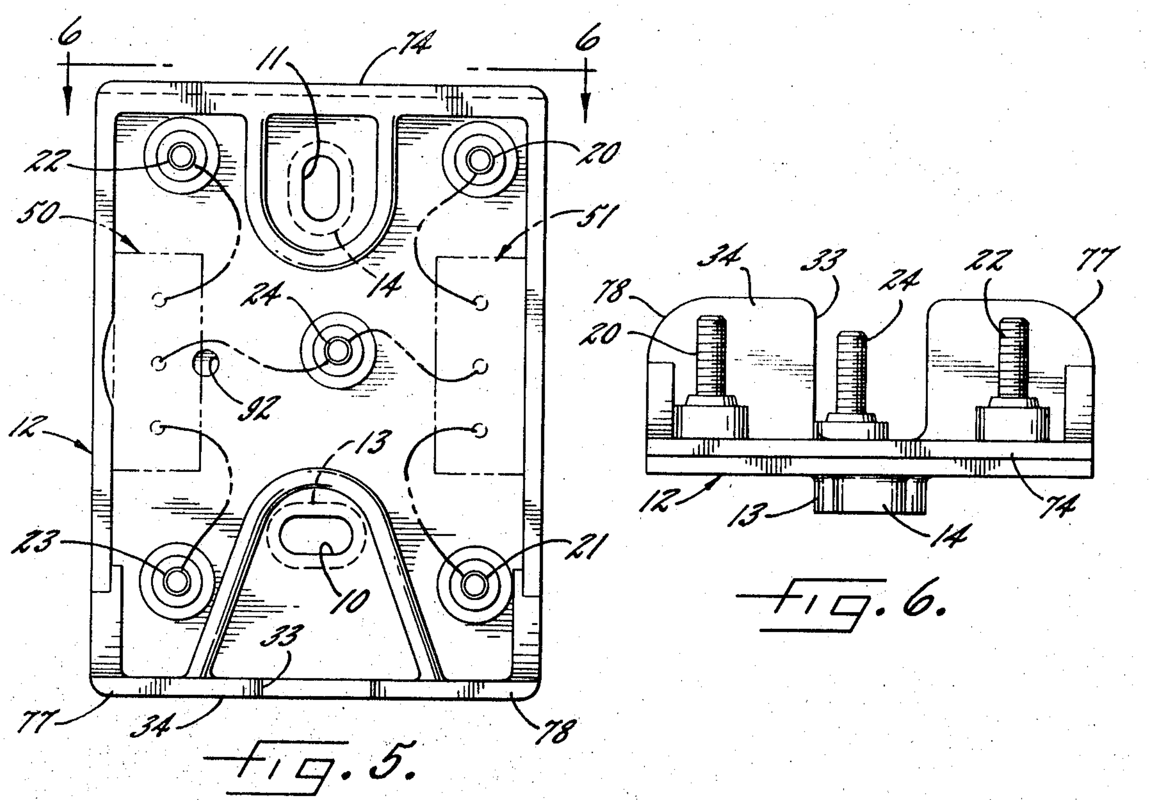
FIG. 5 is an enlarged top plan view of the terminal block of the station protector of FIGS. 1–4.
FIG. 6 is an end elevation taken along line 6—6 in FIG. 5.

Turning now to the drawings and referring first to FIG. 1, there is shown a complete telephone station protector adapted to protect two different telephone lines, i.e., two different conductor pairs, at the same time. As is well known by those skilled in the art, a telephone station protector provides protection against voltage surges such as might be caused by lightning or accidental contact of the telephone lines with electrical power lines or induced currents, for example. The station protector is mounted on a suitable surface S at the subscriber's facility, by means of two screws or other fasteners passed through two countersunk holes 10, 11 in the base 12 of the protector. In the illustrative device, the two holes 10 and 11 extend through two corresponding feet 13 and 14 projecting from the rear side of the base or terminal block 12 to provide a support for the protector on uneven mounting surfaces (FIG. 2) and to provide air circulation behind the base. The two holes 10 and 11 are also elongated to facilitate adjustments in the final position of the protector base 12 on the mounting surface S.

For connecting the telephone lines to be protected, the terminal block 12 is provided with two pairs of line terminals 20, 21 and 22, 23 for connection to the two pairs of line conductors normally provided in a standard telephone service line. A fifth terminal 24 is provided for connection to conventional grounding elements. To connect the line and ground conductors from the protector, the service line, and the subscriber line to the respective terminals 20–24, each terminal is threaded and provided with a nut, such as the nut 20*a* on terminal 20, with three washers 20*b* disposed under the nut. Three washers 20*b* are provided so that each of the three conductors fastened to each line terminal can be positioned on a separate washer. The five terminals 20–24 are all located on raised pedestals to facilitate the connecting of the various wires to their respective terminals. The terminals are symmetrically spaced on the terminal block and are located as far apart as possible to reduce electrical leakages as well as to provide optimum space for the arrester module and other electrical transmission aids. The height of the pedestals, and thus that of the terminals, is coordinated with the arrester module height as will hereinafter be described.

To provide access for the telephone service line 30, as well as the subscriber line and ground wire into the interior of the protector, a slot 33 is formed in an upstanding end wall 34 at one end of the protector base. A grommet 35 is fitted into the slot 33 to provide a seal around the lines and wires entering the protector, for preventing insects or other foreign matter from entering and accumulating inside the protector. The end wall 34 registers with the open end of a cover 36 which is attached to the base 12 in a manner to be described in more detail below.

In accordance with one important aspect of the present invention, the active elements of the station protector are encased in two separate modules; and the base of the protector forms two corresponding areas for receiving the arrester modules so that the active elements of the protector can be easily and quickly replaced. Thus, in the illustrative arrangement, two modules 50 and 51 encase the active elements for protecting the various lines and equipment connected to the protector, and any property and persons exposed thereto, from voltage surges in the telephone lines. The external size and shape of the two modules 50 and 51 are generally identical so that they are completely interchangeable (although the internal structure of the modules may be varied for different applications, as will be discussed in more detail below). Moreover, since a separate module is provided for each conductor pair, either one or two modules, any combination of protectors or other transmission aids may be inserted into the protector, depending upon whether the protector is serving one or two telephone lines at any given time. Since the structures of the two modules 50 and 51 are generally identical, only one module 50 will be described in detail herein.

Figure 7:
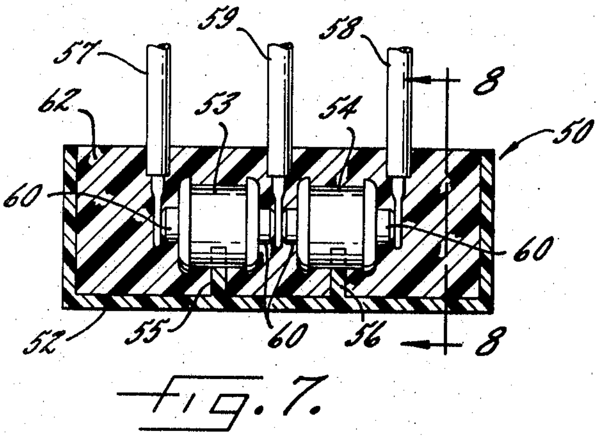
FIG. 7 is an enlarged perspective of one of the removable fail-safe arrester modules included in the station protector of FIG. 1.
Figure 8:
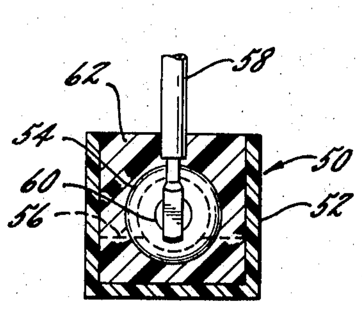
FIG. 8 is a section taken along line 8—8 in FIG. 7.
Figure 9:
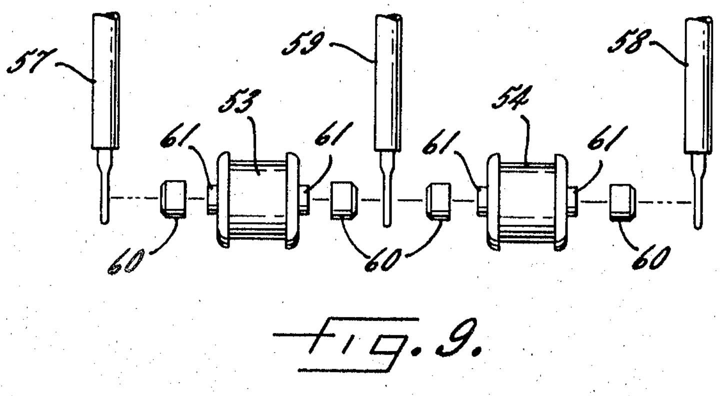
FIG. 9 is an exploded plan view of the electrical elements in the module of FIG. 7.

Referring to FIGS. 7–9, the module 50 comprises a rectangular casing 52 housing two electrode pairs each of which is spaced apart by a gas-filled discharge chamber. The electrode pairs and the gas-filled discharge chambers therebetween are typically preformed and connected to the desired electrical leads to form a subassembly which is positioned within the casing 52, after which the casing is filled with a thermosetting resin to permanently encapsulate the subassembly therein with one end of each electrical lead extending outwardly therefrom. Example of suitable preformed electrode pairs having gas-filled discharge chambers therebetween are the type A3-C350 and type T1-C350 SVP gas-filled tubes which are manufactured by and commercially available from Siemens Corporation, Iselin, N.J. The type A3-C350 tube contains only a single pair of electrodes so that two such tubes must be used in each module 50, to provide the two required electrode pairs, while the type T1-C350 tube contains three electrodes forming the two required electrode pairs with one electrode common to each pair so that only one such tube is needed in each module. Two of the type A3-C350 tubes are less expensive than one type T1-C350 tube, but the rate surge discharge current of the type A3-C350 tubes is 10,000 amperes while the rated surge discharge current of the type T1-C350 tubes is 20,000 amperes. Thus, it can be seen that the choice of a particular tube type for any given application involves both economic and surge discharge current considerations.

In accordance with another important aspect of the invention, each electrode pair within the module 50 must have associated therewith a fail-safe means which permanently connects the two electrodes together in response to a voltage surge which exceeds a predetermined limit. Thus, the preferred gas-filled tubes mentioned above, namely the types A3-C350 and T1-C350, include metallic elements within the tubes which fuse to interconnect the electrodes when the voltage surge exceeds the tube's discharge capability. In the case of voltage surges that are within the tube's discharge capability, the gas in the space between the electrodes is ionized to render the tube momentarily conductive and thereby dissipate the excess voltage to ground, without fusing the metallic elements which provide the fail-safe function.

To position the two gas tubes 53 and 54 centrally within the casing 52, the casing includes a pair of integral ribs 55 and 56 having central notches or recesses designed to conform with the cylindrical body portions of the two gas tubes 53 and 54. One electrode of the gas tube 53 is connected via conductor or lead 57 to the line terminal 20; one electrode of the gas tube 54 is connected via conductor 58 to the other line terminal 21, and the other electrodes of the two tubes 53 and 54 are connected via a common ground conductor 59 to the ground terminal 24. The exposed end portion of each conductor 57, 58 and 59 is spot welded to one or two end caps 60 designed to fit snugly over the projecting cylindrical member 61 on each end of each gas tube 53 and 54. Each conductor is spot welded to its respective end cap or caps 60 before the cap is applied to the gas tube, so that the gas tube is not subjected to the heat of the welding operation.

After the conductors 57–59, the end caps 60 and the gas tubes 53 and 54 have been assembled and seated on the ribs 55 and 56 within the casing 52, the cavity of the casing 52 is filled with a thermosetting plastic material which is then allowed to cure so as to form a solid yet expandable unitary mass 62, encapsulating the two gas tubes 53 and 54 and the end portions of the conductors 57–59 connected thereto. Desirably, a clear epoxy resin is first used for the encapsulating and a polyurethane layer is then employed over the epoxy. Any of the conventionally used encapsulating materials are suitable; however, the unitary mass should be capable of expanding when a surge is accepted. The module is then ready for insertion in the terminal block 12. The encapsulation of the gas tubes and the end portions of the wires connected thereto relieves any strains on the wires and their insulation so as to reduce the chances of breakage during both manufacture and use of the illustrative protector.

According to another feature of this invention, the terminal block and the arrester modules are designed to provide a low profile unit which obviates the need for the terminal block to include mounting means for the modules. To this end, the arrester modules with their three leads and the terminal block with its line terminals are constructed so that the arrester modules may be positioned flush against the base of the terminal block, with the requisite rigidity being provided by the arrester module leads.

Thus, as is seen in FIG. 10, the arrester module 50 rests flush against the terminal block 12; and the leads 57–59 extend from the top 90 of the arrester module casing 52. The height of the module and the terminals 20–24 and raised pedestals of the terminal block 12 are designed such that, in a preferred embodiment of the present invention, the leads 57–59 upon connection to the respective terminals 20–24 each form a loop. This loop configuration combines with the substantially rigid character of the leads to prevent, when the modules are placed in position and connected to the terminals via the leads, undesirable movement that could undesirably weaken, or even break, the leads as well as possibly impairing attachment of the cover to the terminal block. By the "substantially rigid character of the leads," it is meant that the lead be sufficiently rigid so that it will prevent the undesired movement of the model yet possesses adequate flexibility to allow bending to form the connection on the terminals without breaking. It has been found suitable to employ a self-extinguishing polyvinyl chloride insulation to sheathe the copper conductors.

Yet another feature of the present invention provides a station protector which is capable of accommodating other electrical transmission aids, such as, for example, load coils, build out capacitors, and the like if desired. Thus, as can be seen in FIGS. 1 and 10, the base of the terminal block 12 is formed with a punch-out hole 92, suitable for mounting the electrical transmission aid such as the load coil 94 by any suitable fastening means such as a screw 96. The terminal block is sized to accommodate other electrical transmission aids, as for example, a build out capacitor, shown at 98. Adequate space is also provided to allow mounting a copper-/aluminum interface, indicated generally at 100 (FIG. 11) for terminating an aluminum wire to a brass terminal. This is employed when, for example, the drop wire to the line terminals is aluminum.

In order to fasten the cover 36 to the base 12, the cover is adapted to be latched to the base at opposite ends thereof by advancing the cover over the base until the trailing end of the cover interlocks with one end of the base while the leading end of the cover is tilted upwardly above the base, and then pivoting the cover downwardly about the interlocked trailing end until a pair of detent latching elements on opposite sides of the leading end of the cover snap into place at the bottom of the base. Thus, the illustrative cover 36 is open at one end to receive the upstanding end wall 34 on the base 12 with walls 70, 71 and 72 depending from the opposite end and both sides, respectively, of the cover. To fasten the cover 37 to the base 12, the cover 37 is advanced from left to right as viewed in FIG. 1 until a lip 73 on the lower edge of the covered end wall 70 fits under a flange 74 on the end of the base 12 opposite the upstanding end wall 34. At this point, the trailing end of the cover 36 is interlocked with the corresponding end of the base 12, while the leading end of the cover is tilted upwardly above the base end wall 34. This upward tilting of the cover 36 is necessitated by a pair of end flanges 75 and 76 formed on the inner edges of the open ends of the two side walls 71 and 72 and continuing along adjacent portions of the bottom edges of the same side walls for a limited distance. As will be apparent from the ensuing description, the bottom portions of these flanges 75 and 76 form detent latching elements which secure the leading end of the cover 36 to the base 12.

To complete the fastening of the cover 36 to the base 12, the leading open end of the cover 36 is pivoted downwardly toward the base 12, using the interlocked rib 73 and flange 74 as a fulcrum or hinge line, so that the bottom portions of the flanges 75 and 76 engage beveled or curved upper corners 77 and 78 formed on the end wall 34. Continued downward force applied to the leading end of the cover 36 causes the bottom portions of the flanges 75 and 76 to be cammed outwardly away from the base 12 due to the limited degree of resiliency of the cover side walls 71 and 72. The flanges 75 and 76 then slide downwardly over the exterior side walls of the base 12 until they come into register with a pair of notches 79 and 80 formed in the underside of the base 12 beneath opposite ends of the upstanding end wall 34. When the bottom portions of the flanges 75 and 76 come into register with these notches 79 and 80, the flanges snap into the notches to latch the leading end of the cover 36 to the base 12. It will be appreciated that this detent latching arrangement locks the leading end of the cover in two directions, i.e., it not only prevents the cover from being lifted upwardly away from the base 12, but also prevents retracting movement of the cover away from the end wall 34 and the flange 74, so that the bead 73 on the trailing end of the cover is maintained in interlocking engagement with the flange 74.

To further stabilize the latching arrangement between the cover 36 and the base 12, a series of three spaced ribs 81, 82 and 83 project inwardly from the end wall 70 of the cover so that when the cover is in its final latched position, the bottom edges of these three ribs engage the top surface of the base flange 74 at three laterally spaced points. This arrangement holds the bead 73 and the flange 74 in firm engagement with each other in a direction normal to the plane of the base 12 so that the cover 36 remains perfectly stable on the base 12, thereby preventing the occurrence of any gaps or openings through which dirt or other contaminants could leak into the interior space between the cover 36 and the base 12. To further insure a tight seal between the interfaces of the cover 36 and the base 12, a pair of arcuate ribs 84 and 85 are formed on the inside corners of the cover 36 directly above the base end wall 34; these ribs 84 and 85 have a shape which is complementary to that of the curved corners 77 and 78 on the base end wall 34 so that as the cover 36 is pivoted downwardly over the end wall 34, the lower edges of the ribs 84 and 85 fit snugly against the upper surfaces of the rounded corners 77 and 78. Further reinforcement of the cover 36 is provided by an internal rib 86 which stiffens the central portion of the cover and thereby provides further stability to the overall assembly.

To facilitate release of the detent latches when the cover is in place on the base, the side walls 71 and 72 of the cover extend beyond the upstanding end wall 34 of the base so that the free ends of the side walls are accessible from outside the covered assembly. Thus, the side walls 71 and 72 of the illustrative cover are provided with beveled end portions 71*a* and 72*a*, respectively, which extend beyond the base end wall 34 so that when it is desired to remove the cover from the base, pressure can be exerted manually on the inside surfaces of the extended portions of the side walls to force them laterally away from the side walls of the base 12. This outward flexing movement of the side walls removes the lower portions of the flanges 75 and 76 from their corresponding notches 79 and 80 so that the cover is free to be pivoted upwardly about the hinged connection formed by the lead 73 and the flange 74. After the open end of the cover is pivoted upwardly, the cover is moved longitudinally away from the flange 74 so as to disengage the rib 73 therefrom. The cover is then completely detached from the base so that the entire internal area of the base assembly is accessible. It will be appreciated that the detent latching arrangement is easily visible from the underside of the station protector when it is installed in the manner shown in FIG. 2, so that it will be readily apparent to the person desiring to remove the cover where the pressure is to be applied to release the detent latch.

A still further feature of this invention provides a telephone station protector which has adequate space to allow termination of the metallic grounding shield to occur interiorly, thus preventing exposure of the conventional splice to adverse weather conditions. To this end, and as is shown in FIG. 1, the ground terminal 24 is spaced a sufficient distance from the end of the terminal block so that the metallic grounding shield, illustrated generally at 104, terminates interiorly of the station protector.

As can be seen from the foregoing detailed description, this invention provides an improved telephone station protector system in which the active elements are fail-safe type gas-filled tubes encased in separate modules to permit quick and easy replacement of the active elements. The use of the separate modules in combination with the protector base permits either one or two pairs of active elements to be provided in the protector at any given time, depending upon whether the protector is serving one or two telephone lines at that time. Thus, the protector may be adapted to serve one or two telephone lines by simply inserting and removing the modules 50 and 51, so that it is necessary to remove or replace the entire protector assembly when it is desired to make a change. For example, the protector may be initially installed with only a single module, for serving only one subscriber line, and then when a second subscriber line is added at a later date a second module may be added to the protector without adding another base. Furthermore, when one of the active elements fails, in response to a sustained voltage surge for example, the active elements may be quickly and easily replaced by simply replacing one of the modules. Moreover, because the protector assembly includes only a few parts, most of which can be made by simple plastic molding operations, the protector can be efficiently manufactured at a low cost. It also minimizes maintenance and service time, and can be installed with a minimum amount of labor. Versatility is achieved by means which allow the mounting of other transmission aids on the terminal block.

The overall configuration provides a system with a low silhouette or profile (viz. - depth when mounted) so as to minimize the possibility that the unit will be damaged, as by bumping. More importantly, possible injury to persons in the area is similarly minimized due to the low silhouette of the unit.

I claim as my invention:

1. A telephone station protector comprising the combination of an arrester module comprising at least two electrode pairs with the two electrodes in each pair spaced apart by a gas-filled discharge chamber, one electrode of each pair being connected to different ones of a pair of substantially rigid line conductors adapted for connection to a corresponding pair of conductors comprising a telephone line, the other electrode of each pair being connected to a common grounding conductor whereby a voltage surge on either of said line conductors within the discharge capability of the electrode pair connected thereto renders the discharge chamber between that electrode pair temporarily conductive to connect the respective conductor to ground, and fail-safe means within the discharge chamber of each electrode pair shunting the respective line conductors to ground in response to a voltage surge on either of said line conductors in excess of the discharge capability of the electrode pair connected thereto, said electrodes and the end portions of the conductors connected to said electrodes being embedded in a solid unitary mass; an insulating terminal block forming areas for receiving at least two of said arrester modules and having two pairs of electrical terminals adjacent said areas for connecting said pair of line conductors from each module to the corresponding conductors of a telephone service line, and a ground terminal for connecting said grounding conductors from said modules to grounding means, said arrester modules being positioned flush against the terminal block and the relative height of said arrester modules and the connection of said line conductors to said electrical terminals providing a loop in said line conductors to maintain the arrester modules in position; and a cover adapted to fit over said base member to enclose said terminals and said modules.

2. A telephone station protector as set forth in claim 1 wherein said two electrode pairs are contained in at least one preformed tube which forms the discharge chamber between each electrode pair, said discharge chamber being filled with an ionizable gas, and said fail-safe means is also contained in said tube.

3. A telephone station protector as set forth in claim 2 wherein said fail-safe means comprises at least one metallic element associated with each electrode pair and adapted to fuse to interconnect the electrode pair in response to a voltage surge across the electrode pair in excess of the discharge capability of the electrode pair.

4. A telephone station protector as set forth in claim 1 wherein said terminal block includes means for mounting electrical transmissions aids in a substantially flush fashion.

5. A telephone station protector as set forth in claim 1 wherein said ground terminal is located in a position on said terminal block to allow termination of the metallic shield on the ground conductor interiorly of the station protector.

6. A telephone station protector as set forth in claim 1 wherein the conductors from said modules are located adjacent the terminals on said base member when said modules are positioned in the areas provided therefor on said base member.

7. A telephone station protector as set forth in claim 1 wherein said ground terminal is located between said areas for receiving said modules so that the common grounding conductors from both modules can be easily connected to said ground terminal.

8. A telephone station protector as set forth in claim 1 wherein each of said areas for receiving said protector modules is located between one pair of said electrical terminals for connecting the pair of line conductors from the module placed in said areas to the corresponding conductors of a telephone service line.

* * * * *

UNITED STATES PATENT OFFICE
CERTIFICATE OF CORRECTION

Patent No. 3,851,220 Dated November 26, 1974

Inventor(s) Joseph T. Charles

It is certified that error appears in the above-identified patent and that said Letters Patent are hereby corrected as shown below:

Column 8, line 44 delete "base member" and insert --terminal block--.

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*